J. P. NESTE.
STRAW RACK FOR GRAIN SEPARATORS.
APPLICATION FILED APR. 22, 1908.
930,785.
Patented Aug. 10, 1909.
2 SHEETS—SHEET 1.
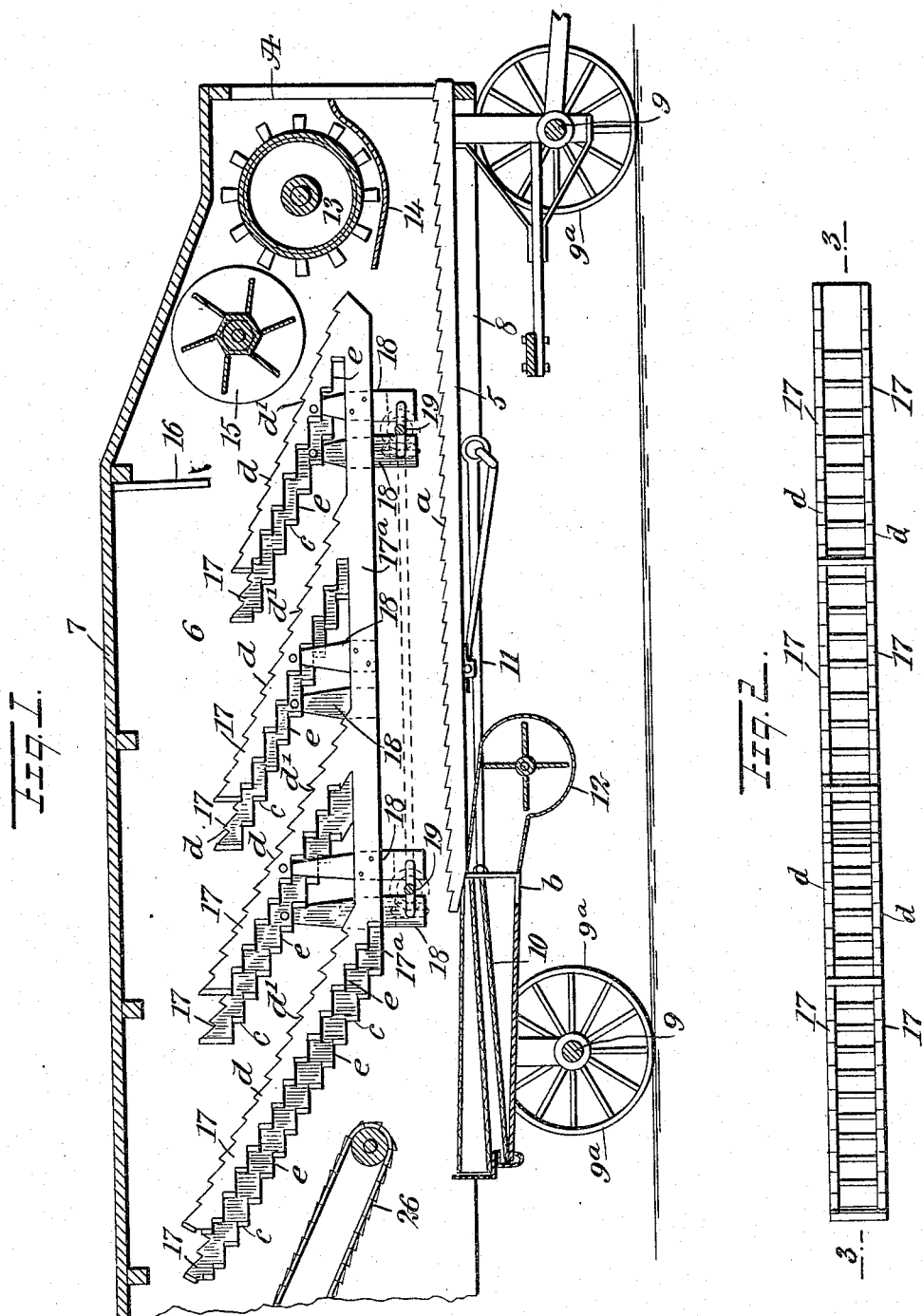
WITNESSES
INVENTOR
James P. Neste
BY
ATTORNEYS

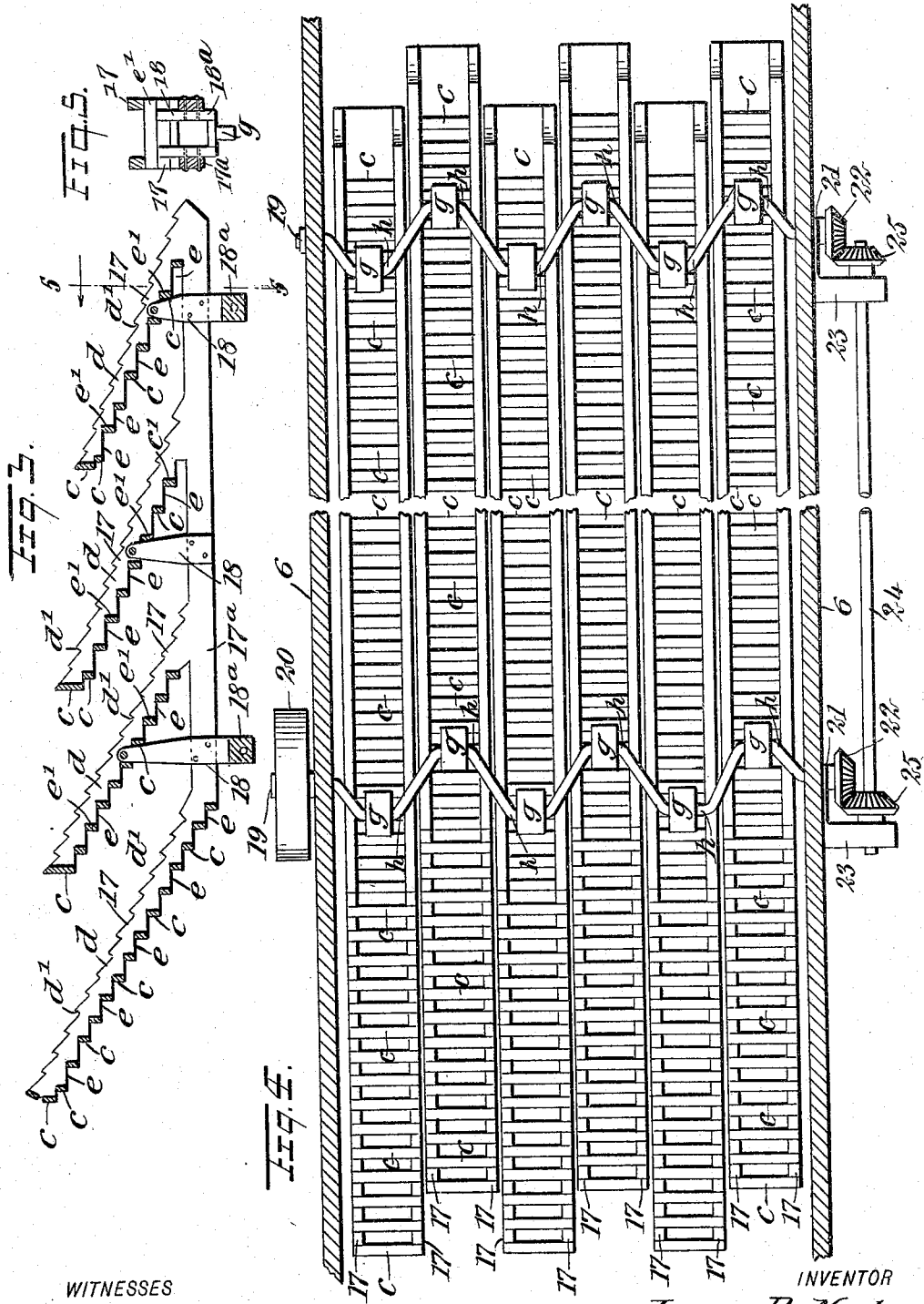

they are secured by transverse bolts or other means and, as

UNITED STATES PATENT OFFICE.

JAMES PETTER NESTE, OF LAKE MILLS, IOWA.

STRAW-RACK FOR GRAIN-SEPARATORS.

No. 930,785.  Specification of Letters Patent.  Patented Aug. 10, 1909.

Application filed April 22, 1908. Serial No. 428,482.

*To all whom it may concern:*

Be it known that I, JAMES PETTER NESTE, a citizen of the United States, and a resident of Lake Mills, in the county of Winnebago and State of Iowa, have invented certain new and useful Improvements in Straw-Racks for Grain-Separators, of which the following is a full, clear, and exact description.

The purpose of the invention is to provide novel and advantageous details of construction for straw racks, that are adjuncts of a grain separator, whereby positively continuous and regular speed and reciprocating motion of the racks is assured, and a reliable separation of the grain from the straw is produced while the threshing operation is being conducted.

The invention consists in the novel construction and combination of parts, as is hereinafter described and defined in the appended claim.

Reference is to be had to the accompanying drawings forming a part of this specification, in which similar characters of reference indicate corresponding parts in all the views.

Figure 1 is a sectional side view of a grain separator, showing novel details in dotted lines; Fig. 2 is a plan view of one section of the straw rack; Fig. 3 is a partly sectional side view, substantially on the line 3—3 in Fig. 2, Fig. 4 is a reversed plan view of the separator apparatus and of novel details thereon, and Fig. 5 is a section on the line 5—5 of Fig. 3.

As the present invention is an improvement on a well known grain separator, a brief description of the latter will be given to enable a clear understanding of the new features, and the advantages obtained by their use.

An elongated, box-like structure, made up of a bottom wall or grain-pan 5, side walls 6 and deck 7, is mounted upon a bottom frame 8, that is supported for progressive movement on axles 9 and wheels $9^a$, this structure being in common use. The grain-pan 5, that constitutes the floor of the separator casing, is transversely grooved as at $a$ in Fig. 1 and extends from the front end of the frame 8 to the rear and discharges grain and chaff, that fall thereon at its rear end, upon screens 10, shaken by a reciprocating pitman 11, that is actuated by mechanism not shown.

Below the rear portion of the grain-pan 5 a fan 12 is supported therefrom and is adapted to create a blast of air that blows the chaff from the grain that falls on the screens 10, the clean grain passing off of the bottom screen through an opening $b$. A threshing cylinder 13 is rotatably supported transversely in the casing, above a concave 14, near an open feed throat A in the front end of said casing, and adjacent to the cylinder 13, rearward thereof, a winged beater 15 is rotatably held in the casing which, as usual, forces the threshed straw and chaff together with the loose grain that pervades the straw, rearward and upon the series of racks provided for the separation of the grain from the chaff. Coöperating with the beater 15 is a depending straw deflector 16, known as the grain cloth, which directs the straw as it is pressed rearward by the beater downward toward the straw-carrying racks. In this construction, the straw-carrying racks are arranged in separate sections, each section consisting of two rack members 17, which are spaced apart in parallel planes by a plurality of similar cross bars $c$.

The members 17 of all the straw-carrying sections are serrated on their upper edges, the teeth $d$ thereon sloping from shoulders $d'$ forwardly and downwardly, said teeth, by their engagement with the straw, preventing a retrograde movement thereof. To enable the proper attachment of the cross-bars $c$ of each pair of the rack members 17, the lower edges of said bars are notched, forming serrations $e$ that incline in the same direction as the serrations $d$. The serrations $e$ are of such depth as to produce shoulders $e'$, whereon the cross-bars $c$ are secured by their ends, so that said cross-bars $c$ are disposed evenly spaced apart in parallel planes. Any preferred number (four being shown) of the rack-bars 17 are arranged in the same plane and inclined upward and rearward at equal distances apart, by their fixed connection at their lower ends with a straight spacing bar $17^a$, the two sets of rack-bars 17 forming a single section of the straw-rack, that are connected by the cross-bars $c$, being thus similarly inclined rearward and upward.

At nearly equal distances apart three bracket arms 18 are secured upon the inner sides of three rack-bars 16, one near each end of the spacing-bar $17^a$ from which the rack bars project. The arms 18 project down and lap upon the inner sides of a respective spacing bar $17^a$, whereon they are secured by transverse bolts or other means and, as shown, the pair of arms on the spaced rack bars 17 of each rack section, near the ends of the spacing bars therefor, project an equal distance below the latter and are connected in pairs at their lower ends by like cross- ars 18ª, and on each of said cross-bars, t the center thereof, a journal-box $g$ is secured.

For the support, side by side, of the series of straw carrier sections, six in number, as shown in Fig. 4, two crank-shafts 19 are provided, each having a number of cranks formed thereon equal to the number of rack sections, and as shown, the cranks $h$ on each shaft 19 are projected oppositely in alternate order, but all in the same horizontal plane. The straw-carrier sections are in like order coupled with the cranks $h$ by the loose engagement of said cranks with the journal-boxes $g$ at the centers of the cross-bars 18ª and, as shown in Fig. 4, this connection of the shafts with the straw-carrier sections causes the latter to project past each other at their ends, in directions corresponding with the trend of the cranks on the shafts 19. An end portion of each transverse shaft 19 is journaled in one side wall 6 of the separator casing, and on one projecting end of the shaft farthest from the front end of said casing a driving pulley 20 is secured, which in service is engaged by a driving belt, not shown, actuated by a source of power and rotary motion. The shafts 19, at their opposite ends, are passed through openings in the opposite side wall 6 of the separator casing, and are journaled in boxes 21 fixed on said side wall, a bevel pinion 22 being secured on the end of a respective shaft outside of the box in which it is journaled.

In bracket boxes 23 that project from the side wall 6 adjacent to the boxes 21 a driven shaft 24 is journaled near its ends, the latter projecting sufficiently to receive a bevel pinion 25 on each end whereon said pinions are secured. Each pinion 25 meshes with an adjacent pinion 22, and thus the crank shafts 19 are adapted for simultaneous rotation when the pulley 20 is rotated.

Rearward of the series of rack sections a straw-conveyer 26 is positioned, this being in the form of an endless belt, shown partially in Fig. 1, that in completed condition transfers straw that leaves the rack sections, out of the rear end of the separator.

In operation, grain to be threshed is passed into the throat A, below the cylinder 13, and thence passes beneath the beater 15 and grain cloth 16 onto the straw rack sections, that are now given a jigging motion vertically and longitudinally.

An important feature of this invention consists in the provision of the driven shaft 24 and bevel pinions that connect its ends with the crank shafts 19.

It has been found that dust and chaff cause belts to slip on pulleys heretofore used for such a purpose, but the positive geared connection shown and described insures the continuous agitation of the straw as it passes rearward over the rack sections.

The thin cross-bars $c$ employed for connecting the section members 17 are all disposed in parallel vertical planes, and but slightly obstruct the fall of the threshed grain through the racks and onto the grain pan, while proper strength is afforded each section of the straw-rack.

The particular construction of the rack members 17, their attachment in spaced inclined order, the respective spacing bars 17ª, and the attachment of the depending arms 18 thereto, are claimed as novel features, together with the boxes $g$ at the centers of the cross-bars 18ª on the arms 18, wherein the series of journals $h$ on the crank-shafts 19 are loosely secured.

It will be seen that the improvements insure positive, continuous operation of the straw rack and the separation of grain from the straw, as it is moved over the rack sections, and that the grain will be separated from the chaff, as usual.

Having thus described my invention, I claim as new and desire to secure by Letters Patent:

A straw carrying rack section consisting of two side bars arranged parallel and in spaced relation, each of said side bars being provided with a plurality of inclined members partially overlapping one another, each member having its upper edge serrated forming teeth, and its lower edge notched forming vertical shoulders, cross bars secured at their ends upon the shoulders of the oppositely arranged members of the side bars, and connecting the same, a plurality of bracket arms secured to the side bars and having their upper ends secured to the inclined members thereof, the bracket arms adjacent to the ends of the side bars being extended below said bars, cross bars connecting the lower projecting ends of the said bracket arms, and a journal box on each cross bar at the center thereof.

In testimony whereof I have signed my name to this specification in the presence of two subscribing witnesses.

JAMES PETTER NESTE.

Witnesses:
 JOHN H. STANLEY,
 LOUIS NESTE.